(12) United States Patent
Popov et al.

(10) Patent No.: US 12,347,466 B1
(45) Date of Patent: Jul. 1, 2025

(54) DATA STORAGE DEVICE WITH COMMAND SELECTION THAT MINIMIZES FREQUENCY OF PRE-HEATING

(71) Applicant: WESTERN DIGITAL TECHNOLOGIES, INC., San Jose, CA (US)

(72) Inventors: Zarko Popov, Mission Viejo, CA (US); Andrew Larson, Rochester, MN (US); Wayne H. Vinson, Longmont, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/582,927

(22) Filed: Feb. 21, 2024

(51) Int. Cl.
| | |
|---|---|
| *G11B 20/12* | (2006.01) |
| *G11B 5/012* | (2006.01) |
| *G11B 5/48* | (2006.01) |
| *G11B 5/60* | (2006.01) |
| *G11B 5/00* | (2006.01) |

(52) U.S. Cl.
CPC .......... *G11B 5/012* (2013.01); *G11B 5/4866* (2013.01); *G11B 2005/0021* (2013.01)

(58) Field of Classification Search
CPC .............. G11B 20/1251; G11B 5/5547; G11B 2005/0021; G11B 20/1242; G11B 20/1037; G11B 20/1079; G11B 20/1217; G11B 2020/1222; G11B 5/596; G11B 5/607; G11B 5/3133; G11B 5/4826; G11B 5/6011; G11B 5/6088; G11B 21/12; G11B 7/131
USPC .......................................................... 360/75
See application file for complete search history.

(56) References Cited

U.S. PATENT DOCUMENTS

| | | |
|---|---|---|
| 6,711,628 B1 | 3/2004 | Thelin |
| 8,456,980 B1 | 6/2013 | Thayamballi |
| 9,128,639 B1 | 9/2015 | Vinson et al. |
| 9,620,162 B1 | 4/2017 | Haralson |
| 9,747,928 B1 | 8/2017 | Ruan et al. |
| 9,916,851 B1 | 3/2018 | Seigler et al. |
| 9,972,344 B2 | 5/2018 | Ruan et al. |

(Continued)

FOREIGN PATENT DOCUMENTS

CN 113689889 A 11/2021

OTHER PUBLICATIONS

Sakoguchi et al., "Mode hopping impact on NFT protrusion measurement in HAMR", https://ieeexplore.ieee.org/document/10177246, dated Jul. 10, 2023; 2 Pages.

*Primary Examiner* — Nabil Z Hindi
(74) *Attorney, Agent, or Firm* — Calderon Safran & Wright P.C.

(57) ABSTRACT

Various illustrative aspects are directed to a data storage device, method, and one or more processing devices that are configured to: estimate access times of a plurality of access commands included in a command queue of a disk drive containing the one or more disks; adjust a respective one of the access times of a respective one of the access commands based on the respective one of the access commands satisfying one of one or more conditions that indicate an increased likelihood of performing a pre-heating operation to heat a laser diode associated with a head of the disk drive; and select one of the access commands as a next command for execution in the disk drive based on the access times.

20 Claims, 6 Drawing Sheets

(56) References Cited

U.S. PATENT DOCUMENTS

| | | | |
|---|---|---|---|
| 10,319,401 B1 * | 6/2019 | Oyabu | ............... G11B 5/3133 |
| 10,522,185 B1 | 12/2019 | Hall | |
| 10,720,177 B1 | 7/2020 | Ng et al. | |
| 10,902,876 B2 | 1/2021 | Tatah et al. | |
| 10,969,965 B2 | 4/2021 | Malina et al. | |
| 10,997,997 B1 | 5/2021 | Xiong | |
| 11,830,524 B1 | 11/2023 | Yasuna et al. | |
| 2014/0029396 A1 | 1/2014 | Rausch et al. | |
| 2016/0148636 A1 | 5/2016 | Ma et al. | |
| 2019/0227721 A1 | 7/2019 | Hall | |

* cited by examiner

DATA STORAGE DEVICE WITH COMMAND SELECTION THAT MINIMIZES FREQUENCY OF PRE-HEATING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 61 comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive next command selection that minimizes time-consuming operations that are undertaken to avoid mode hop, while still minimizing the occurrence of mode hop. In various examples, control circuitry of this disclosure is inventively configured to use a next command selection algorithm that adds a penalty to commands that require a pre-heat on the next command or that transition away from a pre-heated state. In this manner, implementations help minimize pre-heat performance loss in heat-assisted magnetic recording (HAMR) disk drives.

Various illustrative aspects are directed to a data storage device, comprising one or more disks; an actuator mechanism configured to position one or more heads proximate to a corresponding disk surface of a corresponding disk of the one or more disks; and one or more processing devices. The one or more processing devices, individually or in combination, are configured to: estimate access times of a plurality of access commands included in a command queue of a disk drive containing the one or more disks; adjust a respective one of the access times of a respective one of the access commands based on the respective one of the access commands satisfying one of one or more conditions that indicate an increased likelihood of performing a pre-heating operation to heat a laser diode associated with a head of the one or more heads; and select one of the access commands as a next command for execution in the disk drive based on the access times.

Various illustrative aspects are directed to a method comprising: estimating access times of a plurality of access commands included in a command queue of a disk drive containing one or more disks; adjusting a respective one of the access times of a respective one of the access commands based on the respective one of the access commands satisfying one of one or more conditions that indicate an increased likelihood of performing a pre-heating operation to heat a laser diode associated with a head of the disk drive; and selecting one of the access commands as a next command for execution in the disk drive based on the access times. In embodiments, the estimating, the adjusting, and the selecting are performed by one or more processing devices individually or in combination.

Various illustrative aspects are directed to one or more processing devices comprising: means for estimating access times of a plurality of access commands included in a command queue of a disk drive containing one or more disks; means for adjusting a respective one of the access times of a respective one of the access commands based on the respective one of the access commands satisfying one of one or more conditions that indicate an increased likelihood of performing a pre-heating operation to heat a laser diode associated with a head of the disk drive; and means for selecting one of the access commands as a next command for execution in the disk drive based on the access times.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
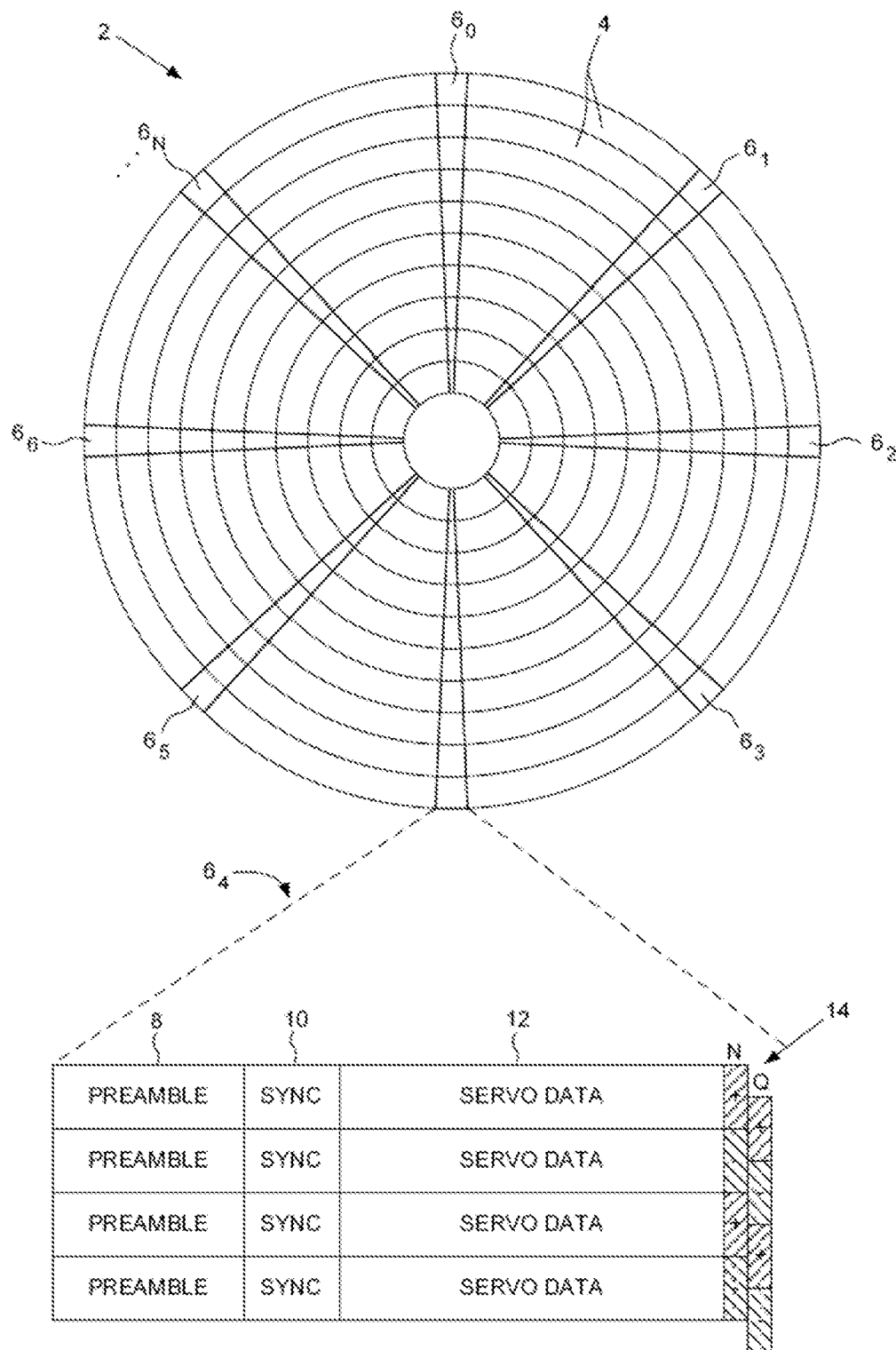
FIG. 1 shows a prior art disk format as comprising a number of radially-spaced, concentric servo tracks defined by servo wedges recorded around the circumference of each servo track.
Figure 2:
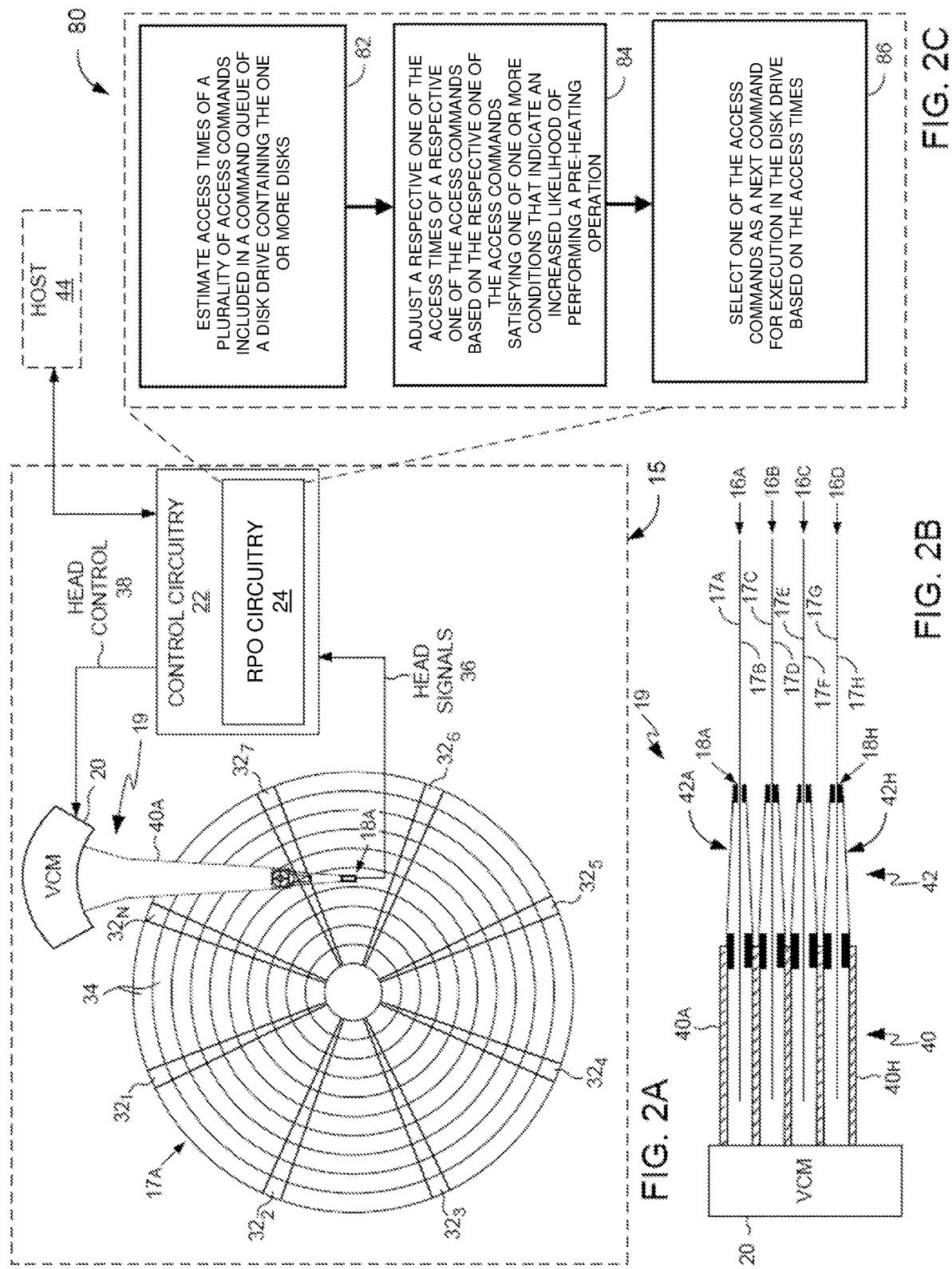
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that rotational position optimization (RPO) circuitry 24 of control circuitry 22 may perform or execute in controlling the operations of disk drive 15, in accordance with aspects of the present disclosure, including next command selection that penalizes time-consuming operations that are undertaken to avoid mode hop, while still minimizing the occurrence of mode hop.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, RPO circuitry 24 of control circuitry 22 may estimate access times of a plurality of access commands included in a command queue of a disk drive containing the one or more disks (82). RPO circuitry 24 may further adjust a respective one of the access times of a respective one of the access commands based on the respective one of the access commands satisfying one of one or more conditions that indicate an increased likelihood of performing a pre-heating operation to heat a laser diode associated with a head of the one or more heads (84). RPO circuitry 24 may further select one of the access commands as a next command for execution in the disk drive based on the access times (86). Control circuitry 22, including RPO circuitry 24, may further perform additional actions, methods, and techniques, in accordance with various aspects including as further described herein.

The term "RPO circuitry 24" as used herein may refer to any hardware, firmware, software, and/or combination thereof, comprised in control circuitry 22 of disk drive 15, which implements, embodies, or engages in any of the structures or functions ascribed herein to RPO circuitry 24 or to any other of the novel and inventive aspects of the present disclosure. RPO circuitry 24 may constitute any hardware, firmware, software, and/or any other elements of control circuitry 22 for performing next command selection that minimizes time-consuming operations that are undertaken to avoid mode hop, while still minimizing the occurrence of mode hop, and performing other techniques and methods as described herein.

Figure 3:
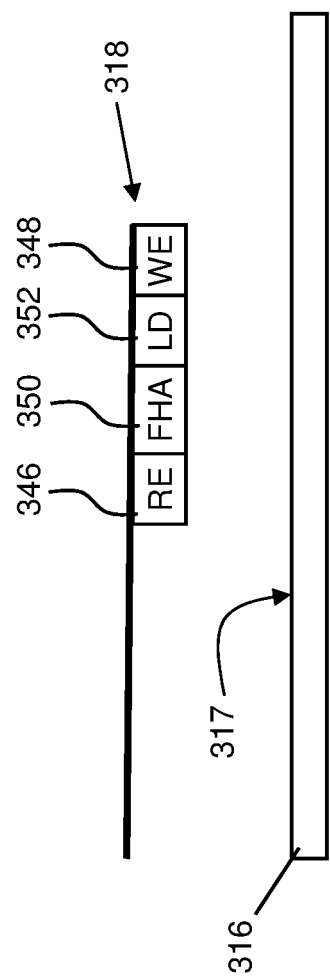
FIG. 3 depicts a head relative to a disk in accordance with various aspects of this disclosure.

FIG. 3 depicts a head relative to a disk in accordance with various aspects of this disclosure. In particular, FIG. 3 shows a disk 316 that corresponds to one of disks 16 of FIG. 2B and a head 318 that corresponds to one of heads 18 of FIG. 2B. The arrangement or disposition of elements of heads 18 of FIG. 2B described herein is not limited to any specific detail as shown in FIG. 3, and the elements of heads 18 of FIG. 2B may be arranged in any of a variety of other configurations in other examples.

With continued reference to FIG. 3, in embodiments head 318 includes a read element 346 (e.g., a magnetoresistive (MR) element), a write element 348 (e.g., an inductive write coil), a fly height actuator 350 (e.g., a thermal fly height control (TFC) element that actuates through thermal expansion or a piezoelectric actuator that actuates through mechanical deflection), and a laser diode 352. Control circuitry 22 (shown in FIG. 2A) writes data to disk surface 317 by modulating a write current in an inductive write coil in write element 348, to record magnetic transitions onto corresponding disk surface 317 in a process referred to as saturation recording. During readback, read element 346 senses the magnetic transitions, and a read channel demodulates the resulting read signal. Control circuitry may use fly height actuator 350 to induce changes in the fly height of head 318 above disk surface 317. Laser diode 352 may be used to generate a laser that is used to temporarily heat an area of disk surface 317 prior to passing under write element 348, as is understood in a heat-assisted magnetic recording (HAMR) disk drive. For example, laser diode 352 may be used with a waveguide and a near-field transducer (NFT) to project a plasmon onto disk surface 317 to heat an area of disk surface 317.

Head 318 of FIG. 3 may be included in a HAMR disk drive, which enables high-quality written data at high densities enabled by a high-coercivity medium of a disk surface, such as, e.g., superparamagnetic iron-platinum nanoparticles, by heating disk surface 317 with a laser emitted by laser diode 352 via the waveguide and the NFT during write operations. Such heating of disk surface 317 decreases the coercivity of the magnetic medium of disk surface 317, thereby enabling the magnetic field generated by the write coil of write element 348 to magnetize the temporarily heated area of disk surface 317. Disk surface 317 encoding the data thus written then cools back down and thereby returns to heightened magnetic coercivity, which durably preserves the written data at higher density than is possible in conventional techniques such as perpendicular magnetic recording (PMR).

HAMR disk drives are susceptible to the phenomenon of mode hop (also called mode hopping) in which the output of the laser diode (such as laser diode 352) changes based in part on a change of temperature of the laser diode. In one example, mode hop can be caused by crossing a thermal boundary at which the geometry of the laser diode changes. Mode hop can cause sudden and unpredictable changes in write width during a write operation, which may result in unwanted erasing of data in adjacent tracks, thus presenting a challenge to increasing areal density in the form of tracks per inch (TPI). Mode hop can also cause undesirable data integrity issues due to introducing a signal phase change at a mid-sector location on the disk surface. It is therefore desirable to minimize mode hop.

Embodiments recognize that one way to minimize or avoid mode hop to is maintain the laser diode (such as laser diode 352) at a constant temperature, thereby avoiding temperature changes of the laser diode that can cause mode hop. One way to maintain the laser diode at a constant temperature is to pre-heat the laser diode to a steady state temperature. Pre-heating the laser diode may be accomplished by performing a pre-heating operation that raises a temperature of the laser diode. This can be accomplished, in one example, using self-heating of the laser diode since the laser diode generates heat when emitting a laser. For example, a pre-heating operation may comprise applying a current to the laser diode that causes a temperature of the laser diode to increase due to self-heating. Pre-heating may be used in a HAMR disk drive to adjust the fly height of the head (such as head 318) prior to a write operation. This is because when an electrical bias is applied to the laser diode during a write operation, the self-heating effect may cause a thermal expansion of one or more components of the head toward the disk surface, which results in a fly height transient. This fly height transient may be reduced by pre-heating the laser diode, e.g., by applying a pre-lase bias, prior to the head reaching the target data sector to be written. However, unlike write operations, HAMR disk drives do not activate the laser diode during read operations. This is because heating the disk surface with the laser during a read operation can result in unwanted erasing of data in the sector being read or other sectors. Therefore, each time a HAMR disk drive transitions from a read operation to a write operation, the disk drive may require performing a new pre-heating operation prior to the write operation. Similarly, each time a HAMR disk drive transitions from a write operation to a read operation, the disk drive is experiencing a cool down time (e.g., losing the heating that was previously achieved for the write operation), such that the disk drive will eventually require performing a new pre-heating operation prior to the next write operation.

Embodiments of the present disclosure recognize that, in order to minimize the frequency of occurrence of pre-heating the laser diode to avoid mode hop in a HAMR disk drive, it is advantageous to minimize the occurrence of cool down times between active write commands. Embodiments achieve this by utilizing a set of command selection algorithm changes that minimize the occurrence of cool down times in a HAMR disk drive, e.g., by defining conditions that indicate an increased likelihood of pre-heating the laser diode and applying a penalty to commands that satisfy one of the conditions. In one example, a command selection algorithm is configured to minimize the occurrence of write to read transitions when selecting a next command for execution. This may be performed, for example, by configuring the command selection algorithm to apply a penalty to selecting a read command immediately after a write command. In another example, the command selection algorithm is configured to minimize the occurrence of read to write transitions when selecting a next command for execution. This may be performed, for example, by configuring the command selection algorithm to apply a penalty to selecting a write command immediately after a read command. In another example, the command selection algorithm is configured to minimize the occurrence of switching heads in the disk drive when selecting a next command for execution. This may be performed, for example, by configuring the command selection algorithm to apply a penalty to selecting a write command on a second head immediately after a write command on a first head that is different than the second head. By configuring the command selection algorithm in this manner, embodiments maximize the selection of write commands on a same head and in close proximity to a write command being currently executed, which minimizes the occurrence of cool down times between active write commands, which in turn minimizes the frequency of pre-heating the laser diode for the purpose of avoiding mode hop. In this manner, by penalizing commands that indicate an increased likelihood of performing a pre-heating operation, embodiments provide an improvement in HAMR disk drives by minimizing a frequency of performing time consuming operations that are undertaken to avoid mode hop while still minimizing the likelihood of mode hop occurring.

Referring again to FIG. 2A, RPO circuitry 24 may execute an RPO algorithm (i.e., a command selection algorithm) in order to prioritize the access commands in a command queue based on the mechanical latency of disk drive 15 (e.g., the seek latency of the head and the rotational latency of the disk). In one example, the seek latency of a head (such as head 18A) corresponds to the distance the head must move radially over the disk to access a target track corresponding to an access command in the command queue. In one example, the rotational latency of the disk corresponds to the angle the disk must rotate before the head reaches the first target data sector of the target track. In embodiments, the RPO algorithm estimates an access time for an access command by estimating the number of servo sectors that will be crossed when seeking the head to the target track (e.g. a seek time), and the number of servo sectors that will be crossed waiting for the disk to rotate until the head is over the target data sector (e.g., a rotational time). In some embodiments, a more sophisticated RPO algorithm may be employed that evaluates other variables in addition to the seek latency of the head and the rotational latency of the disk in order to estimate the access time of an access command.

Access commands in the command queue may include thousands (or even tens of thousands) of read commands and write commands awaiting execution by disk drive 15 and received from various sources including but not limited to host 44, a write cache, and internally generated by control circuitry 24 for tasks such as adjacent track interference (ATI) refreshing. In embodiments, RPO circuitry 24 estimates a respective access time for each respective access command in the command queue using one or more RPO algorithms.

In accordance with aspects of the present disclosure, the access time estimated by RPO circuitry 24 for at least one of the access commands is adjusted based on the at least one of the access commands satisfying one of one or more conditions that indicate an increased likelihood of performing a pre-heating operation of a laser diode (e.g., such as laser diode 352 of FIG. 3) in a head of disk drive 15. In embodiments, RPO circuitry 24 adjusts the access time for each access command that satisfies one of the one or more conditions that indicate an increased likelihood of performing a pre-heating operation of the laser diode. In embodiments, RPO circuitry 24 then selects a next access command to execute by disk drive 15 based on the access times of all commands in the command queue, including access times adjusted as described herein, e.g., by selecting the one of the access commands in the command queue having the smallest (e.g., fastest) access time. In embodiments, and as described herein, conditions that indicate an increased likelihood of performing a pre-heating operation of the laser diode may include but are not limited to: transitioning from a read operation to a write operation; transitioning from a write operation to a read operation; and transitioning from a write operation using one head to a write operation using another head.

Figure 4:
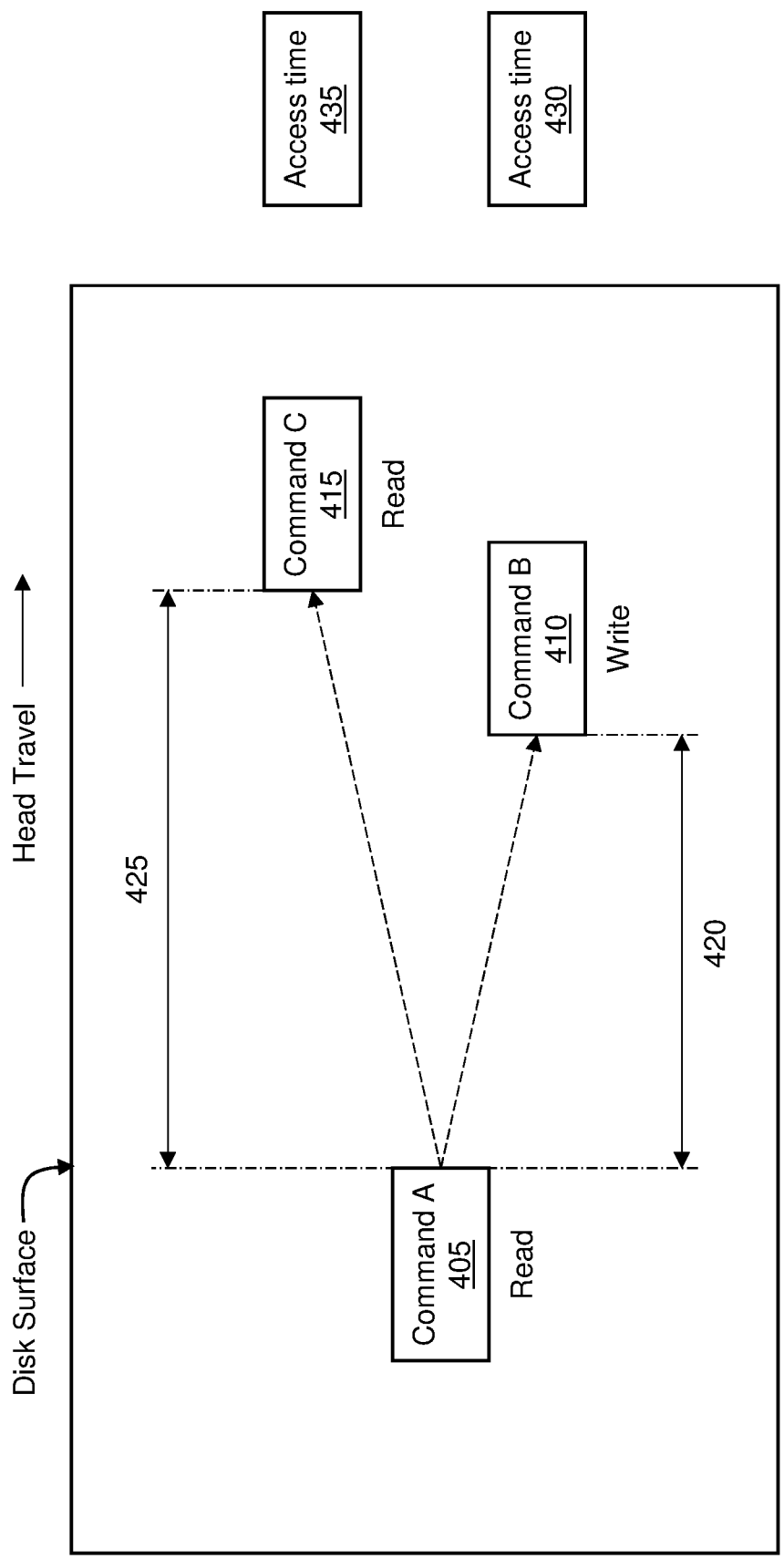
FIG. 4 illustrates an example of adjusting an access time of an access command in accordance with aspects of the present disclosure.

FIG. 4 illustrates an example of adjusting an access time of an access command in accordance with aspects of the present disclosure. In FIG. 4, command A 405 represents a current command being executed by disk drive 15 of FIG. 2A, and command B 410 and command C 415 represent two access commands in a command queue of disk drive 15. The command queue may contain many more access commands than the two access commands shown in FIG. 4; however, only two such access commands shown in FIG. 4 are for simplicity. In the example of FIG. 4, command A 405 is a read operation on a disk surface of disk drive 15, command B 410 is a write operation on the same disk surface using the same head as command A 405, and command C 415 is a read operation on the same disk surface using the same head as command A 405. In the example of FIG. 4, distance 420 represents a distance the head (e.g., head 18A) of disk drive 15 would travel between the completion of command A 405 and the start of command B 410, and distance 425 represents a distance the head (e.g., head 18A) of disk drive 15 would travel between the completion of command A 405 and the start of command C 415. Although distance 420 is shown as one-dimensional for simplicity, distance 420 in actuality may include a first distance the head would travel over the disk surface while seeking from a current track associated with command A 405 to a target track containing a first target data sector of command B 410 (e.g., a seek distance), and a second distance the head would travel over the disk surface while in the target track and before the head reaches the first target data sector of command B 410 (e.g., a rotational distance). Similarly, distance 425 may include a first distance the head would travel over the disk surface while seeking from a current track associated with command A 405 to a target track containing a first target data sector of command C 415, and a second distance the head would travel over the disk surface while in the target track and before the head reaches the first target data sector of command C 415.

In embodiments, and with continued reference to FIG. 4, RPO circuitry 24 (of FIG. 2A) uses an RPO algorithm to estimate a first access time 430 for command B 410 and second access time 435 for command C 415. In one example, the respective access times 430 and 435 are estimated based on the respective distances 420 and 425. For example, the RPO algorithm may estimate an access time for an access command by estimating the number of servo sectors that will be crossed when seeking the head to the target track, and the number of servo sectors that will be crossed waiting for the disk to rotate until the head is over the target data sector. Embodiments are not limited to this example, though, and other access time estimation techniques may be used.

In embodiments, and with continued reference to FIG. 4, RPO circuitry 24 also determines whether either of command B 410 or command C 415 satisfies one of one or more conditions that indicate an increased likelihood of performing a pre-heating operation of the laser diode, and RPO circuitry 24 adjusts the access time of each command that satisfies one of the conditions. In one embodiment, conditions that indicate an increased likelihood of performing a pre-heating operation of the laser diode may include: transitioning from a read operation to a write operation; transitioning from a write operation to a read operation; and transitioning from a write operation using one head to a write operation using another head. In the example of FIG. 4, command B 410 satisfies one of these conditions (i.e., transitioning from a read operation to a write operation), while command C 415 does not satisfy any of these conditions. Accordingly, in the example of FIG. 4, RPO circuitry 24 adjusts the access time of command B 410 and does not adjust the access time of command C 415. In embodiments, adjusting an access time of an access command comprises applying a penalty to the access time, which may include increasing the value of the access time.

In embodiments, RPO circuitry 24 selects a next command for execution from the command queue based on the respective access times of all the respective access commands in the command queue. As noted above, command B 410 and command C 415 may represent two of thousands of access commands in the command queue, where each of these access commands has an estimated access time. In embodiments, RPO circuitry 24 selects, as the next command for execution, the one of all the access commands having the smallest access time. In the example of FIG. 4, the access time of command B 410 used in the next command selection process is the access time that has been adjusted as a result of satisfying one of the conditions that indicate an increased likelihood of performing a pre-heating operation of the laser diode. This adjusting increases the value of the access time of command B 410, thus making command B 410 less likely to be selected as the next command compared to the situation if the access time of command B 410 had not been adjusted.

In embodiments, when an access command satisfies the condition of a read-to-write transition, such as command B 410 in the example of FIG. 4, an amount (or magnitude) of the adjustment to the access time of the access command may be based on a pre-heat time associated with the access command. In one embodiment, RPO circuitry 24 adjusts an access time of an access command (such as command B 410 in the example of FIG. 4) by adding a pre-heat time to the access time of the access command. For example, RPO circuitry 24 may obtain a value of a pre-heat time for an access command (such as command B 410 in the example of FIG. 4) from firmware (such as in control circuitry 24), and RPO circuitry 24 may add this pre-heat time to the access time of the access command. Different configurations may be used when adjusting the access time in this manner. In one example, RPO circuitry 24 adds the pre-heat time to the access time. In another example, if disk drive 15 is configured to perform pre-heating of head 18A while head 18A is seeking, then RPO circuitry 24 may adjust the access time of an access command by setting the access time as the higher of the access time and the pre-heat time. In another example, if disk drive 15 is not configured to perform pre-heating of head 18A while head 18A is seeking, and instead is configured to perform pre-heating of head 18A after head 18A has reached the target track, then RPO circuitry 24 may adjust the access time of the access command by setting the access time as the sum of the pre-heat time and a seek time portion of the access time.

In another embodiment, RPO circuitry 24 adjusts an access time of an access command (such as command B 410 in the example of FIG. 4) by adding a fraction of the pre-heat time to the access time of the access command. In this embodiment, when one of the access commands satisfies the condition of transitioning from read to write, such as in the case of command B 410 in the example of FIG. 4, RPO circuitry 24 may determine the number of write commands in the command queue that use the same head as the one of the access commands. RPO circuitry 24 may then obtain a value of a pre-heat time for the one of the access commands from firmware, determine a fraction of the pre-heat time by dividing the pre-heat time by the determined number of write commands in the command queue that use the same head as the one of the access commands, and add this determined fraction of the pre-heat time to the access time of the one of the access commands. In this manner, the magnitude of the penalty applied to the one of the access commands is based on the number of write operations available in the command queue for this particular head of the disk drive. In the example shown in FIG. 4, RPO circuitry 24 determines the number of write operations in the command queue that use the same head as command B 410, obtains a pre-heat time for command B 410, determines a fraction of the preheat time by dividing the obtained pre-heat time by the determined number of write operations in the command queue that use the same head as command B 410, and adjusts the access time of command B 410 by adding the determined fraction of the pre-heat time to the access time of command B 410. In this manner, the cost of the penalty applied to command B 410 is amortized based on the possibility of performing plural write operations sequentially with the same head, since performing plural write operations sequentially with the same head minimizes cycles of cooling down and subsequently pre-heating, which thus minimizes the occurrence of performing time consuming operations for the purpose of avoiding mode hop.

In some embodiments, RPO circuitry 24 adjusts the access time using a fraction of the preheat time, instead of the entire preheat time, based on the determined number of write commands in the command queue that use the same head as the one of the access commands exceeding a predefined threshold. In one example, the predefined threshold comprises a percentage of the total number of access commands in the command queue. In this example, if the determined number of write commands in the command queue that use the same head as the one of the access commands exceeds a predefined percentage of the total number of access commands, then RPO circuitry 24 adjusts the access time of the one of the access commands using the determined fraction of the pre-heat time; otherwise, RPO circuitry 24 adjusts the access time of the one of the access commands using the full pre-heat time.

In some embodiments, when an access command satisfies the condition of a read-to-write transition, such as command B 410 in the example of FIG. 4, an amount (or magnitude) of the adjustment to the access time of the access command may comprise a predefined amount. The predefined amount may be any desired amount, including but not limited to the time of one revolution of the disk, a fraction (e.g., half) of the time of one revolution of the disk, or other predefined amounts of time. In embodiments, RPO circuitry 24 adjusts the access time of the access command (e.g., command B 410 in the example of FIG. 4) by adding the predefined amount to the access time of the access command.

Figure 5:
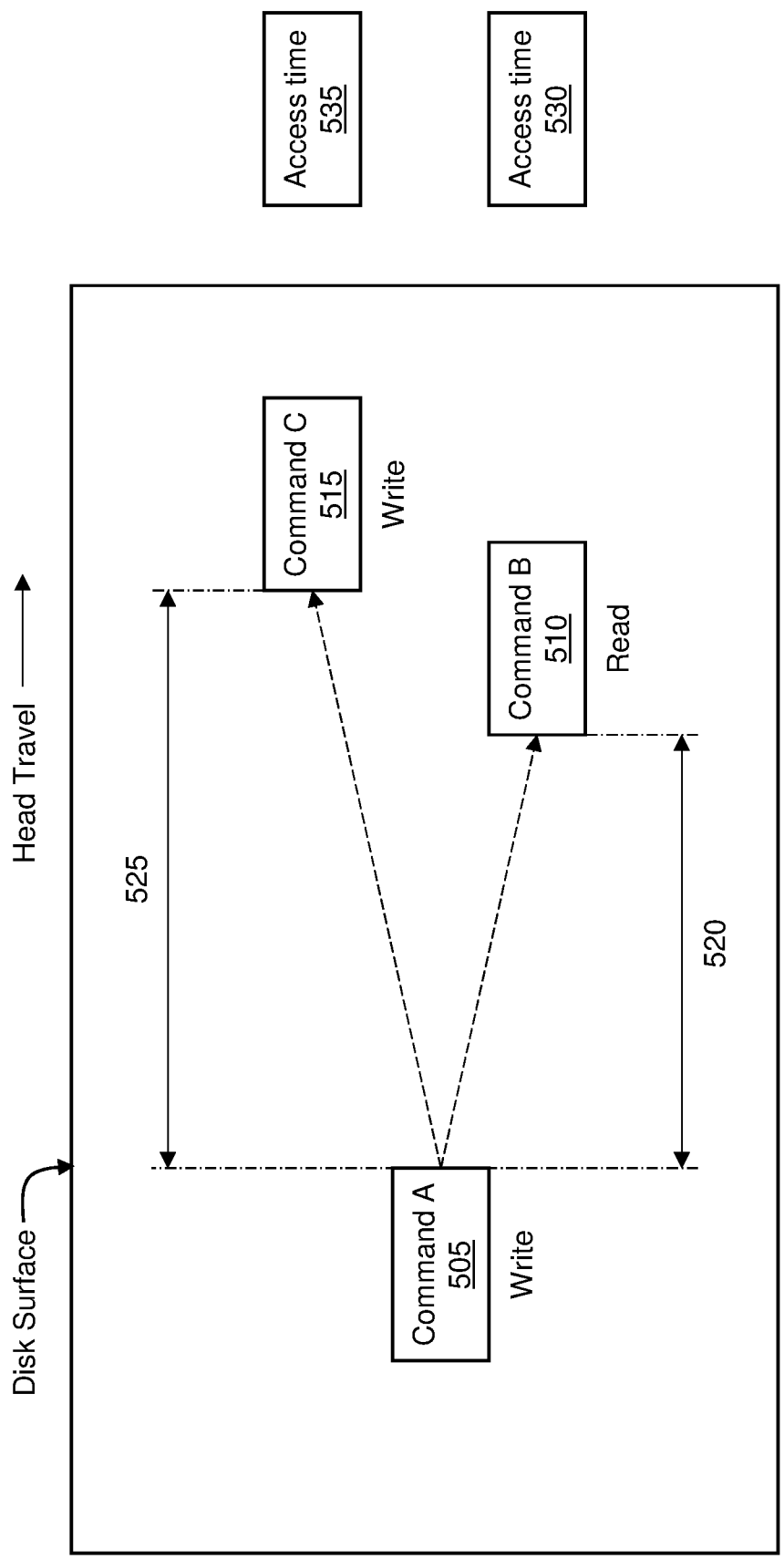
FIG. 5 illustrates another example of adjusting an access time of an access command in accordance with aspects of the present disclosure.

FIG. 5 illustrates another example of adjusting an access time of an access command in accordance with aspects of the present disclosure. In FIG. 5, command A 505 represents a current command being executed by disk drive 15 of FIG. 2A, and command B 510 and command C 515 represent two access commands in a command queue of disk drive 15. The command queue may contain many more access commands than the two access commands shown in FIG. 5; however, only two such access commands shown in FIG. 5 are for simplicity. In the example of FIG. 5, command A 505 is a write operation on a disk surface of disk drive 15, command B 510 is a read operation on the same disk surface using the same head as command A 505, and command C 515 is a write operation on the same disk surface using the same head as command A 505. In the example of FIG. 5, distance 520 represents a distance the head (e.g., head 18A) of disk drive 15 would travel between the completion of command A 505 and the start of command B 510, and distance 525 represents a distance the head (e.g., head 18A) of disk drive 15 would travel between the completion of command A 505 and the start of command C 515, e.g., similar to distances 420 and 425 of FIG. 4.

In embodiments, and with continued reference to FIG. 5, RPO circuitry 24 uses an RPO algorithm to estimate a first access time 530 for command B 510 based on first distance 520 and second access time 535 for command C 515 based on second distance 525, e.g., in a manner similar to that described with respect to FIG. 4. In embodiments, RPO circuitry 24 also determines whether either command B 510 or command C 515 satisfies one of one or more conditions that indicate an increased likelihood of performing a pre-heating operation of the laser diode, and RPO circuitry 24 adjusts the access time of each command that satisfies one of the conditions. In the example of FIG. 5, command B 510 satisfies one of these conditions (i.e., transitioning from a write operation to a read operation), while command C 515 does not satisfy any of these conditions. Accordingly, in the example of FIG. 5, RPO circuitry 24 adjusts the access time of command B 510 and does not adjust the access time of command C 515.

In embodiments, and with continued reference to FIG. 5, RPO circuitry 24 selects a next command for execution from the command queue based on the respective access times of all the respective access commands in the command queue. In the example of FIG. 5, the access time of command B 510 used in the next command selection process is the access time that has been adjusted as a result of satisfying one of the conditions that indicate an increased likelihood of performing a pre-heating operation of the laser diode. This adjusting increases the value of the access time of command B 510, thus making command B 510 less likely to be selected as the next command compared to the situation if the access time of command B 510 had not been adjusted.

In embodiments, when an access command satisfies the condition of a write-to-read transition, such as command B 510 in the example of FIG. 5, an amount (or magnitude) of the adjustment to the access time of the access command may comprise a predefined amount. The predefined amount may be any desired amount, including but not limited to the time of one revolution of the disk, a fraction (e.g., half) of the time of one revolution of the disk, or other predefined amounts of time. In embodiments, RPO circuitry 24 adjusts the access time of the access command (e.g., command B 510 in the example of FIG. 5) by adding the predefined amount to the access time of the access command. Adjusting access times of access commands that satisfy the condition of a write-to-read transition in this manner has an overall effect of causing the disk drive to perform groups of write operations with a same head in sequence prior to switching to a read operation, which minimizes the number of cycles of cooling down and subsequently pre-heating.

Figure 6:
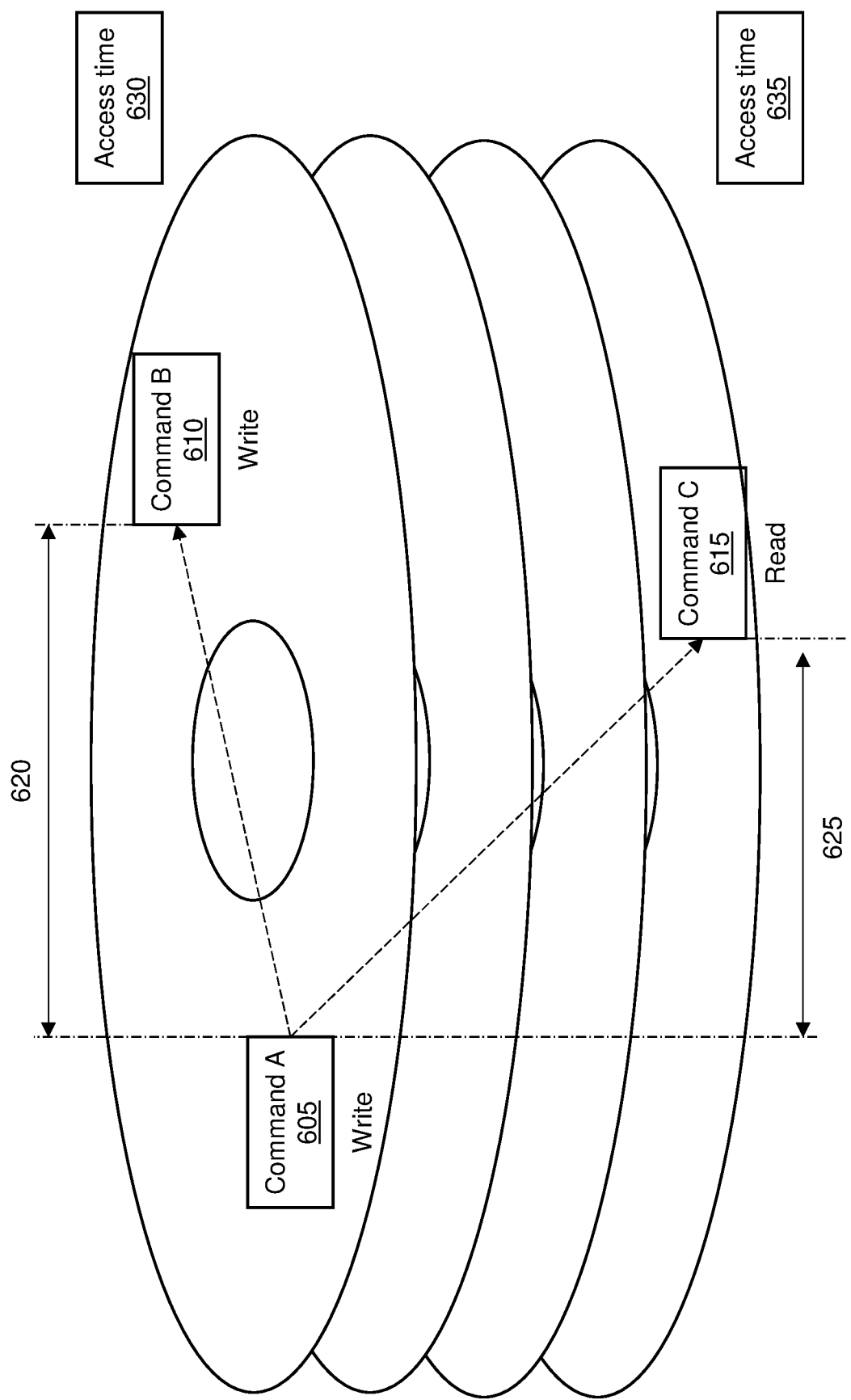
FIG. 6 illustrates another example of adjusting an access time of an access command in accordance with aspects of the present disclosure.

FIG. 6 illustrates another example of adjusting an access time of an access command in accordance with aspects of the present disclosure. In FIG. 6, command A 605 represents a current command being executed by disk drive 15 of FIG. 2A, and command B 610 and command C 615 represent two access commands in a command queue of disk drive 15. The command queue may contain many more access commands than the two access commands shown in FIG. 6; however, only two such access commands shown in FIG. 6 are for simplicity. In the example of FIG. 6, command A 605 is a write operation on a disk surface of disk drive 15, command B 610 is a write operation on the same disk surface and using the same head as command A 605, and command C 615 is a write operation on a different disk surface and using a different head than command A 605. In the example of FIG. 6, distance 620 represents a latency between the completion of command A 605 and the start of command B 610, and distance 625 represents a latency between the completion of command A 605 and the start of command C 615.

In embodiments, and with continued reference to FIG. 6, RPO circuitry 24 uses an RPO algorithm to estimate a first access time 630 for command B 610 based on first distance 620 and second access time 635 for command C 615 based on second distance 625. In embodiments, RPO circuitry 24 also determines whether either command B 610 or command C 615 satisfies one of one or more conditions that indicate an increased likelihood of performing a pre-heating operation of the laser diode, and RPO circuitry 24 adjusts the access time of each command that satisfies one of the conditions. In the example of FIG. 6, command C 615 satisfies one of these conditions (i.e., transitioning from a write operation using one head to a write operation using another head), while command B 610 does not satisfy any of these conditions. Accordingly, in the example of FIG. 6, RPO circuitry 24 adjusts the access time of command C 615 and does not adjust the access time of command B 610.

In embodiments, and with continued reference to FIG. 6, RPO circuitry 24 selects a next command for execution from the command queue based on the respective access times of all the respective access commands in the command queue. In the example of FIG. 6, the access time of command C 615 used in the next command selection process is the access time that has been adjusted as a result of satisfying one of the conditions that indicate an increased likelihood of performing a pre-heating operation of the laser diode. This adjusting increases the value of the access time of command C 615, thus making command C 615 less likely to be selected as the next command compared to the situation if the access time of command C 615 had not been adjusted.

In embodiments, when an access command satisfies the condition of a write-to-write transition on different heads, such as command C 615 in the example of FIG. 6, an amount (or magnitude) of the adjustment to the access time of the access command may be determined in the same manner as described with respect to FIG. 4. For example, the adjustment to the access time of the access command may comprise adding a pre-heat time of the access command, or a determined fraction of the pre-heat time, to the access time. The pre-heat time of a command when moving from one disk to another, as in the example of FIG. 5 when transitioning from command A 605 on a first disk to command C 615 on a second disk, may be different for different disk drives that have different pre-heating capabilities.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface of a corresponding disk among the one or more disks; and
   one or more processing devices, individually or in combination, configured to:
   estimate access times of a plurality of access commands included in a command queue of a disk drive containing the one or more disks;
   adjust a respective one of the access times of a respective one of the plurality of access commands based on the respective one of the plurality of access commands satisfying one of one or more conditions that indicate an increased likelihood of performing a pre-heating operation to heat a laser diode associated with a head of the one or more heads; and
   select one of the plurality of access commands as a next command for execution in the disk drive based on the access times.

2. The data storage device of claim 1, wherein the one or more conditions that indicate an increased likelihood of performing a pre-heating operation include:
- transitioning from a read operation to a write operation;
- transitioning from a write operation to a read operation; and
- transitioning from a write operation using a first head to a write operation using a second head different than the first head.

3. The data storage device of claim 1, wherein the adjusting the respective one of the access times comprises adjusting the respective one of the access times based on a pre-heat time of the respective one of the plurality of access commands.

4. The data storage device of claim 3, wherein the adjusting the respective one of the access times based on the pre-heat time comprises adding the pre-heat time to the respective one of the access times.

5. The data storage device of claim 3, wherein the adjusting the respective one of the access times based on the pre-heat time comprises setting the respective one of the access times as equal to the pre-heat time.

6. The data storage device of claim 1, wherein the adjusting the respective one of the access times comprises adjusting the respective one of the access times based on a determined fraction of a pre-heat time of the respective one of the plurality of access commands.

7. The data storage device of claim 6, wherein the one or more processing devices, individually or in combination, are further configured to:
- determine a number of write operations in the command queue that use a same head as the respective one of the plurality of access commands; and
- determine the fraction of the pre-heat time by dividing the pre-heat time by the determined number of write operations.

8. The data storage device of claim 7, wherein the adjusting the respective one of the access times comprises adding the determined fraction of the pre-heat time to the respective one of the access times.

9. The data storage device of claim 1, wherein the adjusting the respective one of the access times comprises adding a predefined amount to the respective one of the access times.

10. The data storage device of claim 1, wherein the disk drive comprises a heat-assisted magnetic recording (HAMR) disk drive.

11. A method comprising:
- estimating access times of a plurality of access commands included in a command queue of a disk drive containing one or more disks;
- adjusting a respective one of the access times of a respective one of the plurality of access commands based on the respective one of the plurality of access commands satisfying one of one or more conditions that indicate an increased likelihood of performing a pre-heating operation to heat a laser diode associated with a head of the disk drive; and
- selecting one of the plurality of access commands as a next command for execution in the disk drive based on the access times,
- wherein the estimating, the adjusting, and the selecting are performed by one or more processing devices individually or in combination.

12. The method of claim 11, wherein the one or more conditions that indicate an increased likelihood of performing a pre-heating operation include:
- transitioning from a read operation to a write operation;
- transitioning from a write operation to a read operation; and
- transitioning from a write operation using a first head to a write operation using a second head different than the first head.

13. The method of claim 11, wherein the adjusting the respective one of the access times comprises adjusting the respective one of the access times based on a pre-heat time of the respective one of the plurality of access commands.

14. The method of claim 11, wherein the adjusting the respective one of the access times comprises adjusting the respective one of the access times based on a determined fraction of a pre-heat time of the respective one of the plurality of access commands.

15. The method of claim 11, wherein the adjusting the respective one of the access times comprises adding a predefined amount to the respective one of the access times.

16. One or more processing devices comprising, , individually or in combination:
- means for estimating access times of a plurality of access commands included in a command queue of a disk drive containing one or more disks;
- means for adjusting a respective one of the access times of a respective one of the plurality of access commands based on the respective one of the plurality of access commands satisfying one of one or more conditions that indicate an increased likelihood of performing a pre-heating operation to heat a laser diode associated with a head of the disk drive; and
- means for selecting one of the plurality of access commands as a next command for execution in the disk drive based on the access times.

17. The one or more processing devices of claim 16, wherein the one or more conditions that indicate an increased likelihood of performing a pre-heating operation include:
- transitioning from a read operation to a write operation;
- transitioning from a write operation to a read operation; and
- transitioning from a write operation using a first head to a write operation using a second head different than the first head.

18. The one or more processing devices of claim 16, wherein the means for adjusting the respective one of the access times comprises means for adjusting the respective one of the access times based on a pre-heat time of the respective one of the plurality of access commands.

19. The one or more processing devices of claim 16, wherein the means for adjusting the respective one of the access times comprises means for adjusting the respective one of the access times based on a determined fraction of a pre-heat time of the respective one of the plurality of access commands.

20. The one or more processing devices of claim 16, wherein the means for adjusting the respective one of the access times comprises means for adding a predefined amount to the respective one of the access times.

* * * * *